J. Worsley,
Calender-Roll.

Nº 16,319.          Patented Dec. 23. 1856.

UNITED STATES PATENT OFFICE.

JOHN WORSLEY, OF PROVIDENCE, RHODE ISLAND.

MANUFACTURING CALENDER-ROLLS.

Specification of Letters Patent No. 16,319, dated December 23, 1856.

*To all whom it may concern:*

Be it known that I, JOHN WORSLEY, of Providence, in the county of Providence and State of Rhode Island, have invented a new and useful improvement in rolls for calenders, mangles, washing-machines, or any other kinds of machines used in manufacturing and finishing cotton, woolen, silk, paper, or any other kinds of goods; and I hereby declare the following to be a full and true description thereof, reference being had to the drawings herewith presented.

The nature of my improvement consists in making the rolls of the husks of maize (or Indian corn) a material not heretofore used for that purpose.

To enable others to make the same I will describe the manner of proceeding.

Figure 1:
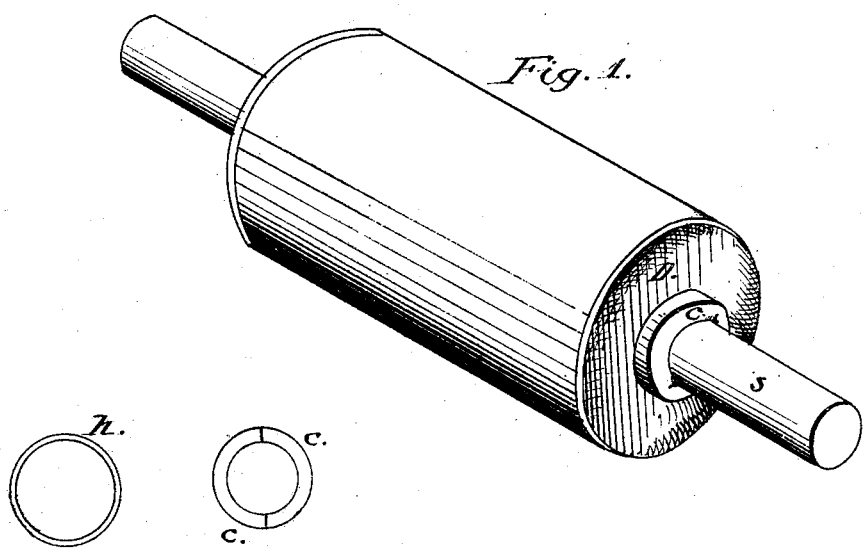
Figure 2:
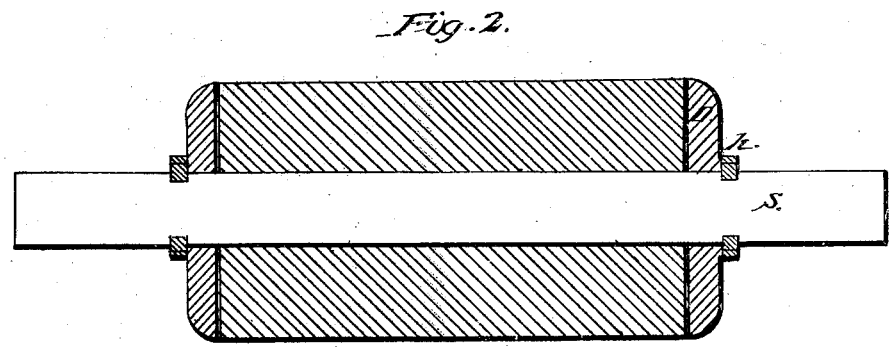

First I select the husks. These are well dried and pressed into a form that we call cheeses, (say about 100 lbs. each). These cheeses have a hole in them the size the shaft is to be. They are then placed on a shaft of metal having a strong head or disk (D) secured near one end (see drawing.) Figure 2 is a section through the entire lengthwise showing the shaft (S) and disk (D). When a sufficient quantity has been placed on the shaft they are compressed by means of a hydraulic press with a force of about 1,400 tons. So that the husks of a roll of 20 inches in diameter will weigh about 16 lbs. to an inch in length. These being sufficiently compressed are then secured by another disk and collar (G G) which is let into the shaft and confined by a band (Z) the same as paper rolls are usually made and secured. They are then turned off in a lathe and finished as paper and cotton rolls usually are.

I disclaim the manner or form of making the rollers for that has long been in practice by manufacturers of other rolls.

What I claim and desire to secure by Letters Patent is—

The use and employment of the shucks of maize (Indian corn) for making rolls instead of cotton, wood, paper or any other substance now in use.

In testimony whereof I hereto subscribe in presence of two witnesses.

JOHN WORSLEY.

Witnesses:
 JAS. Y. RANSON,
 E. W. DIKE.